United States Patent
Hayman

(10) Patent No.: US 9,831,980 B2
(45) Date of Patent: Nov. 28, 2017

(54) SYSTEMS AND METHODS FOR VEHICLE TRACKING

(71) Applicant: ERM ELECTRONIC SYSTEMS LTD., Rishon Lezion (IL)

(72) Inventor: Meir Hayman, Rishon Lezion (IL)

(73) Assignee: ERM ELECTRONIC SYSTEMS LTD., Rishon Lezion (IL)

( * ) Notice: Subject to any disclaimer, the term of this patent is extended or adjusted under 35 U.S.C. 154(b) by 0 days.

(21) Appl. No.: 15/117,294

(22) PCT Filed: Feb. 4, 2015

(86) PCT No.: PCT/IL2015/050124
§ 371 (c)(1),
(2) Date: Aug. 8, 2016

(87) PCT Pub. No.: WO2015/118530
PCT Pub. Date: Aug. 13, 2015

(65) Prior Publication Data
US 2016/0344509 A1    Nov. 24, 2016

(30) Foreign Application Priority Data
Feb. 6, 2014    (IL) .......................... 230840

(51) Int. Cl.
*H04M 11/04*    (2006.01)
*H04K 3/00*    (2006.01)
(Continued)

(52) U.S. Cl.
CPC ......... *H04K 3/222* (2013.01); *B60R 25/1025* (2013.01); *H04K 3/226* (2013.01);
(Continued)

(58) Field of Classification Search
CPC ..... H04W 4/046; H04W 4/025; H04W 64/00; H04W 4/027
(Continued)

(56) References Cited

U.S. PATENT DOCUMENTS

| | | | |
|---|---|---|---|
| 8,175,573 | B2 | 5/2012 | D'Avello et al. |
| 8,319,615 | B2 | 11/2012 | Snider et al. |

(Continued)

FOREIGN PATENT DOCUMENTS

EP    2308724 A1    4/2011

*Primary Examiner* — Tu X Nguyen
(74) *Attorney, Agent, or Firm* — Browdy and Neimark, PLLC

(57) ABSTRACT

The invention concerns a vehicle tracking network including a plurality of subscriber vehicles and a control-center; and systems and methods for tracking vehicles, which are subscribers to such vehicle tracking network. In certain implementations, the method for tracking a subscriber vehicle includes the following operations carried out at the subscriber vehicle: monitoring operation of one or more services related to at least one of a wireless network communication service and positioning service associated with the subscriber vehicle; upon detecting a failure in at least one of said services, generating a corresponding distress signal encoded to be identifiable by other subscriber vehicle(s) of the vehicle tracking network; and broadcasting the encoded distress signal such that it is detectable by one or more of the other subscriber vehicles of the vehicle tracking network, which are located in the vicinity of the subscriber vehicle broadcasting the distress signal. Another subscriber vehicle(s), which receive the distress signal, may thereby initiate automatic notification of the condition of the vehicle broadcasting the distress signal to the control center.

22 Claims, 6 Drawing Sheets

(51) Int. Cl.
    *B60R 25/102*      (2013.01)
    *H04W 4/04*        (2009.01)
    *H04W 74/08*       (2009.01)
    *H04W 84/04*       (2009.01)
    *H04W 88/08*       (2009.01)

(52) U.S. Cl.
    CPC .............. *H04K 3/825* (2013.01); *H04K 3/88* (2013.01); *H04K 3/90* (2013.01); *H04W 4/046* (2013.01); *H04W 74/0833* (2013.01); *H04K 2203/22* (2013.01); *H04W 84/042* (2013.01); *H04W 88/08* (2013.01)

(58) Field of Classification Search
    USPC .................. 455/404.2, 414.2, 440, 456.1
    See application file for complete search history.

(56) References Cited

U.S. PATENT DOCUMENTS

| | | |
|---|---|---|
| 2004/0005858 A1 | 1/2004 | Cervinka et al. |
| 2008/0103649 A1 | 5/2008 | Shen et al. |
| 2011/0151791 A1 | 6/2011 | Snider et al. |
| 2011/0151799 A1 | 6/2011 | Snider et al. |
| 2011/0151827 A1 | 6/2011 | Snider |
| 2012/0143397 A1* | 6/2012 | Mackay .............. B60R 25/1025 701/1 |
| 2012/0309422 A1* | 12/2012 | Lewis-Evans ...... B60R 25/1025 455/456.1 |
| 2013/0217353 A1 | 8/2013 | Snider |

\* cited by examiner

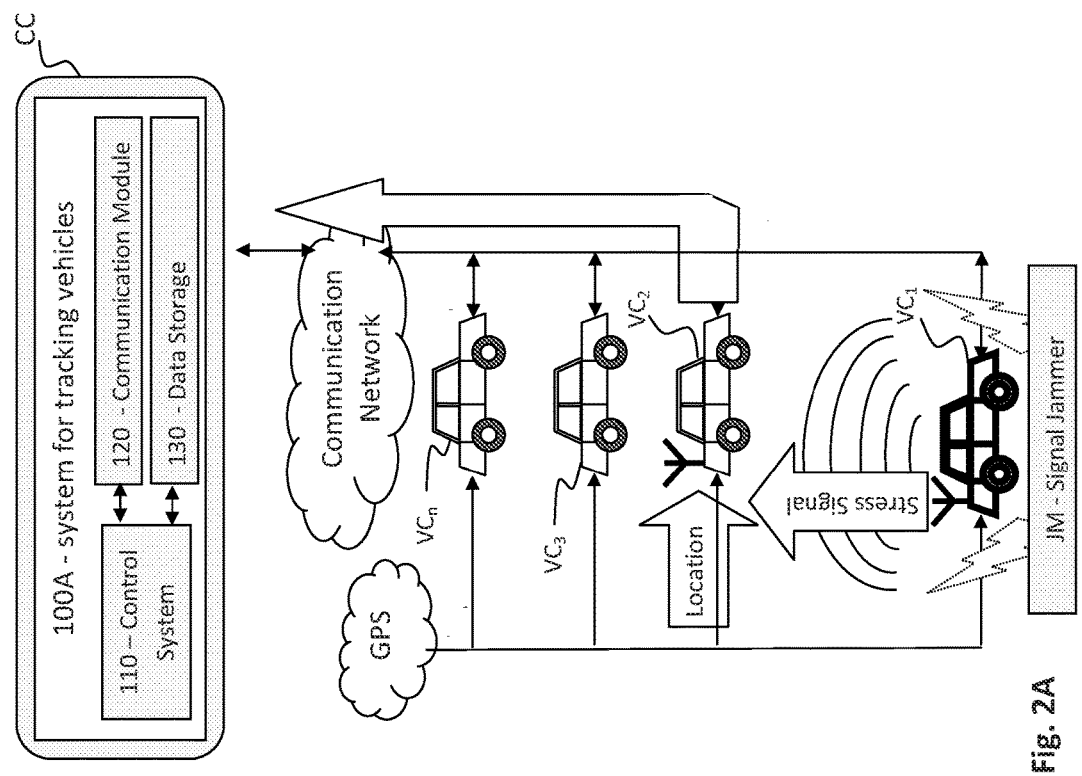

SYSTEMS AND METHODS FOR VEHICLE TRACKING

TECHNOLOGICAL FIELD

The invention is in the field of vehicle tracking and is particularly related to a method and system for communicating information between vehicles and a control center tracking the vehicles.

BACKGROUND

Various types of vehicular security systems are employed in many vehicles to protect such vehicles from theft or other criminal activity. For example, a vehicular security system may be configured to communicate with some external entity (i.e. base-station/control-center; e.g. a police or security center), for delivering notifications to the external entity when an attempt is made to break into a vehicle and/or to steal the vehicle. Some vehicular security systems also include vehicle tracking systems that are operable for tracking the vehicle in case it is stolen.

In many cases, vehicle tracking security systems rely upon a GPS system to pinpoint the location of the vehicle and utilize a communication network, such as a cellular network (e.g. GSM network), to communicate and report, to a base station of a security service provider, the identity, and position of the vehicle. Reporting the vehicle's identity and/or location is typically performed utilizing conventional cellular network protocols such as via Short Message Service (SMS) or General Packet Radio Service (GPRS) data connections. In such techniques, the reporting is performed utilizing bi-lateral communication between the service provider's base station and the vehicle.

Potential vehicle thieves attempt to overcome the operation of such vehicle tracking systems by jamming signal receiving hardware within the vehicle to prevent the vehicle from communication with the base station/control center of the security service provider and/or from detecting GPS signals indicative of the vehicle's location. For example, jamming the vehicle's receiver is in some cases achieved by employing devices that create a strong wide-band signal in the receive band. This practically blocks/jams the reception of signals from the cellular network and/or from a positioning system (such as GPS satellites) at the vehicle. Once such jamming occurs, the operation of the conventional vehicle tracking systems is disrupted because GPS systems rely on reception of satellite signals to determine the position of the vehicle, and/or because communication via cellular and/or other communication networks is generally bi-lateral, requiring both receipt and transmit operations in order to establish communication with the network (e.g. the performance of bi-lateral negotiation/handshake is needed to establish communication). Thus, in the absence/failure of the reception function at the vehicle, failure may occur in obtaining the vehicle's position and/or in establishing communication with the control center of the security service provider.

There are various known in the art techniques for identifying whether jamming is being applied to communication/positioning systems (e.g. to the receivers thereof). Some techniques for jamming detection are described for example in U.S. Pat. No. 8,319,615, U.S. patent publication No. 2004/005858, and in U.S. patent publication No. 2013/217353.

U.S. patent publication No. 2011/151791 is directed to an apparatus and method for maintaining communication between a base station and with a stolen vehicle tracking device. According to this technique, at the stolen vehicle tracking module within the vehicle, it is determined whether jamming is occurring with communications between the stolen vehicle tracking module and the base station, and a temperature is measured at the stolen vehicle tracking module. When jamming is detected, an adjustment is determined for a frequency of an oscillator of the stolen vehicle tracking module and the adjustment is based at least in part upon the temperature. The frequency of operation of an oscillator is adjusted according to the adjustment. A message is transmitted to the base station according to the adjusted frequency.

U.S. patent publication No. 2011/151827 is directed to an apparatus and a method for broadcasting the detection of RF jammer presence. The jamming of a radio frequency (RF) transmission after the vehicle is parked is detected. When the jamming is detected, an emergency message is broadcast on a first random access channel (RACH) associated with the vehicle according to a last known broadcast channel (BCH). When the jamming is detected, at least one last known neighbor serving cell from a stored data structure is determined, and the emergency message is broadcast on one or more second RACHs associated with each of the at least one last known neighbor serving cells.

U.S. Pat. No. 8,175,573 discloses an apparatus and a method for maintaining communications with a vehicle in the presence of jamming. Jamming is detected as occurring to communications associated with at least one electronic device disposed at a vehicle. Responsive to detecting the jamming, an indication is transmitted from the vehicle to a base station informing the base station that jamming is occurring. Communications are subsequently conducted between the base station and the vehicle on at least one predetermined and prearranged communication channel.

GENERAL DESCRIPTION

Conventional vehicle tracking systems, which rely on communication with positioning networks and/or cellular network for providing tracking information to a central control center, are susceptible to malicious jamming. Such jamming is in many cases performed by vehicle thieves to disrupt the tracking of the vehicle by the control center.

As indicated above, there are several known techniques which are directed to tracking vehicles in the presence of malicious jamming of the vehicle (i.e. of receivers associated with the vehicle). However, such conventional techniques for tracking jammed vehicles are complex and cumbersome in terms of the infrastructure and/or cellular-network adaptation they require. Accordingly, the practical implementation of these techniques may be costly and/or inefficient for tracking stolen vehicles to which signal jamming is applied. For example, certain of the above mentioned techniques are based on utilizing random access channels (RACH) of the cellular network for communicating emergency messages, upon detection of jamming. In this regard, it should be understood that using the cellular network's RACH for delivering messages to the control center of a security entity, generally involves establishment of a particular configuration/interface between the control center of a security entity and the cellular communication network provider to enable the security entity to obtain messages communicated via the cellular network's RACH.

Moreover, typically multiple cellular networks are deployed and used by various vehicle users. Thus, in cases where the cellular communication of the tracking system is based on the vehicle's users own cellular device/account, such adaptation (configuration/interface) should be implemented for a plurality of cellular networks to enable tracking of various vehicles associated with different networks by the security entity. This results in costly and sometimes impractical solutions requiring implementing adaptation to the operation of the cellular networks, and it generally also requires the consent of the cellular network service provider for implementing such adaptations.

Some conventional techniques, such as that disclosed in U.S. Pat. No. 8,175,573 utilize predetermined and prearranged channels (e.g. RF channels) to communicate with base stations in the vicinity of the jammed vehicle. Alternatively or additionally, other conventional techniques directed to overcoming the application of signal jamming to vehicles (to interrupt tracking of stolen vehicles), suggest adjusting the frequency used for communication between the vehicle and the base station, upon detection that communication is being jammed (lost) (see for example U.S. patent publication No. 2011/151791). In this connection it should be noted that the operation of such techniques is deficient in cases where jamming is applied to a broad frequency band. This is because in such cases, bi-lateral communication between the vehicle's transceiver and the communication network (which may be required at least for establishing communication via "handshake" protocol), may in such cases be prevented over a broad frequency band covering the entire band, at which the transceiver at the vehicle is operable. Also this approach may be deficient in cases where jamming is applied to a frequency band associated with positioning signals that are used/received by a global positioning system at the vehicle to determine the vehicle's location. Accordingly, it may be sufficient to jam the positioning system in the vehicle and in this manner prevent the transmission of positioning data to the control center.

Also, certain conventional techniques are based on prearranged communication channels which are established by deployment of dedicated network base stations (i.e. stationary positioned antennas relays/repeaters deployed so as to provide a wireless network coverage for wireless communication). In turn, the base stations are used for communicating information between the jammed vehicle and the security service provider (its control/operation center). However deployment of such a network of base stations, adapted for providing prearranged and predetermined communication channels, is typically costly, and accordingly it may be impractical to use such a network for providing nation-wide coverage.

The present invention is directed to a technique for tracking vehicles, such as stolen vehicles, even in cases where the vehicles are being jammed (their network communication and/or their positioning systems are being jammed), for example by a jammer device in the vicinity or in the vehicle transmitting high intensity signals in the frequency band(s) used by the communication systems and/or the positioning systems within the vehicle. In case of such jamming, the reception path of the communication systems and/or positioning systems within the vehicles are jammed by relatively high intensity signals, which may typically be regarded as noise at the reception channel/pass, precluding the reception of genuine signals from the communication network and/or from the positioning network. This may prevent determining the vehicle's position, and/or prevent communicating the vehicle's position and identity to a control center of a security provider entity via the communication network, and/or both. Accordingly, utilizing conventional techniques for tracking of the vehicle by the security entity may be prevented.

The present invention enables tracking a vehicle also in cases where various vehicle systems are being jammed Additionally, the present invention is also advantageous over conventional techniques for handling the jamming of vehicle tracking systems and provides a robust, practical and cost effective solution, which can be implemented within the devices/vehicle-tracking-systems that are installed by the security service provider providing the vehicle tracking services, while without needing modifications or adaptations of external services/systems, such as those associated with the cellular and/or other communication networks.

For example, according to the invention, upon detection that one or more systems such as the GPS receiver system and/or the Cellular/GSM network receiver systems at the vehicle are jammed, an RF signal is broadcasted, encoded to be received/detected by other vehicles which are associated with a vehicle network. The intensity of the RF signal is selected such that it can be identified by vehicles located up to several hundred meters (e.g. up to about one kilometer) from the broadcasting vehicle. Upon detection of such a broadcasted signal by other vehicle(s) of the vehicle network, they forward corresponding notification to a control center of the vehicle network (e.g. of a security service provider associated with the network) together with information on the jammed vehicle and its whereabouts.

To this end, the present invention provides a technique for establishing ad-hoc communication network/communication-pass for uni-lateral (one direction) communication from a jammed vehicle and a security service provider associated therewith. Such uni-lateral communication is resilient to jamming of the vehicle as it does not require that the vehicle receives signals/data from a control center or base stations associated with the security service provider, but only transmit/broadcast data/signals indicating it is being jammed According to certain aspects of the present invention, the ad-hoc communication pass is established in real time, upon detection of jamming, and is formed by utilizing other vehicles which are associated with the security service provider and which are located in the vicinity of the jammed vehicle. Thus, the technique of the invention obviates a need for deployment of dedicated base stations (e.g. stationary antennas) and also obviates a need for modifying the operation of existing networks (e.g. cellular networks) to support this kind of uni-lateral communication.

Systems and methods of the present invention provide for tracking vehicles and determining/estimating their position by the control center even in cases where the vehicles are jammed (hereinafter also termed jammed vehicles in relation to vehicles which positioning systems/modules and/or their network-communication/cellular-communication systems/modules are jammed). This is achieved by utilizing practical and efficient techniques for establishing a vehicle tracking network based on a plurality of vehicle members, being generally subscribers to security services provided by the security entity (e.g. by the security service provider). As will be appreciated from the below description, the members/subscribers of the vehicle network are associated with at least one vehicle tracking receiver module that is capable of receiving and processing distress signals broadcasted by other member(s) of the network, and processing the received distress signals, generating and communicating a corresponding notification including data indicative of the distressed vehicle (e.g. indicative of at least its identity/identifier and its estimated location/position, and possibly also indicative of other of its parameters, such as: its ignition status, speed, heading-direction, initial and/or last time of receipt of the distress signal from the distressed vehicle, etc.), to the control center of the security service provider.

The vehicles, being subscribers to the vehicle tracking network, are furnished/installed with vehicle tracking systems that are adapted for communication vehicle data, indicative for example of the vehicle identity/identifier, vehicle position (e.g. vehicles location and/or orientation (heading-direction)), and possibly also other vehicle's parameters, such as the vehicle's ignition status (on/off) and/or speed to a control center associated with the security service provider (e.g. control center comprising/accommodating a computerized platform and/or web application for tracking vehicles). In this connection, in some cases the vehicle position may be obtained utilizing a positioning network, such as a satellite based positioning network (i.e. hereinafter generally termed as GPS with reference to any such positioning network such as the American GPS network and/or the Russian GLONAS network). Typically, (e.g. in a normal non-jammed mode of operation), the vehicle tracking system communicates with the control center of the security service provider via a wireless network, typically via one or more cellular networks deployed in the region of the vehicle location.

According to the invention, the vehicle tracking system at the vehicle is adapted for monitoring the operation of modules and/or services related the wireless network communication and/or to the positioning network to detect/determine whether they operate properly and/or whether a failure occurs in one of these services/networks, preventing the communication of vehicle data to the control center. This operation may be performed by a jamming detection module that is adapted to determine whether the positioning and/or wireless communication network is being jammed Such a jamming/failure may generally result with inability of the control center to track the jammed vehicle (e.g. either because it fails to establish communication with the vehicle to determine the vehicle data and/or because the vehicle's position cannot be obtained). Therefore, upon detection of such jamming/or failure, the vehicle tracking system shifts to operate in a second, distress mode of operation, in which it utilizes the network established by the plurality of the subscriber/member vehicles to provide and/or convey information of the jammed/distressed subscriber vehicle to the control center. To this end, in response detection of the jamming/failure of the positioning/cellular networks, a distress signal is transmitted/broadcasted by the vehicle tracking system of the distressed subscriber vehicle, which is encoded to be identified by one or more of the other members of the vehicle tracking network that may happen to be located in the vicinity of the distressed vehicle.

As indicated above, the subscribers/members of the vehicle tracking network of the invention, are furnished with a vehicle tracking receiver module that is configured and operable for detecting, receiving and processing distress signals broadcasted by other subscriber vehicles, which are located in their vicinity. Upon detecting and receiving such a distress signal, the vehicle tracking receiver module communicates a corresponding notification including data indicative of the distressed vehicle to the control center (e.g. typically via the cellular network and possibly alternatively or additionally utilizing satellite based communication with the control center).

The data encoded in the notification may include data obtained from the distressed vehicle via the distress signal and/possibly also an estimated location of the distressed vehicle, which may be determined from on-board the vehicle that had received the distress signal from the distressed vehicle.

In turn, the control center of the vehicle tracking network is configured and operable to communicate with one or more of the vehicles of the vehicle tracking network (e.g. via a wireless/cellular communication network/channel). The control center is adapted for receiving, from the vehicle of the vehicle tracking network, notification indicative of a distress signal that originated and was broadcasted by another subscriber vehicle and that includes data indicative of estimated position of the another subscriber vehicle. As indicated above, the distress signal is broadcasted by the subscriber vehicle in response to at least one of: (i) a positioning system at the subscriber vehicle; and (ii) jamming of bi-lateral wireless/cellular communication to the vehicle. The control center is adapted to process a received notification to determine data identifying the distressed subscriber vehicle and data estimating/indicating a position of the distressed subscriber vehicle. Accordingly, tracking the position of the distressed subscriber vehicle is enabled even in cases where the distressed vehicle is being jammed.

It should be understood that the term position and/or positioning herein relates to data indicating the location of a vehicle and/or the orientation of the vehicle (also referred to below as heading and/or driving direction), or to both the location and the orientation of the vehicle.

Thus, according to one broad aspect of the present invention there is provided a vehicle tracking system configured for installation in a vehicle, which is a subscriber to a vehicle tracking network comprising a plurality of subscriber vehicles and a control-center. The vehicle tracking system includes a controller connectable to a wireless communication module and adapted for operating the wireless communication module for communicating vehicle data associated with the vehicle to the control center via a wireless communication network. The controller is associated with a jamming identification module, and includes an encoder module, and a vehicle tracking receiver module. The jamming identification module (which may or may not be a part of the system of the present invention), is configured and operable to identify failure in communication with the control center via the wireless communication network, and upon identifying such a failure, generating a control signal indicative of the condition of the vehicle (e.g. indicative that the vehicle is being jammed). The encoder module is responsive to the control signal for generating a corresponding distress signal encoded to be identifiable by subscriber/member vehicles of the vehicle tracking network, and for broadcasting the encoded distress signal such that it becomes detectable by one or more of the subscriber/member vehicles that are located in the vicinity of the jammed vehicle. This thereby initiates automatic notification of the vehicle's condition from the one or more subscriber/member vehicles which happen to be in the vicinity of the control center. The vehicle tracking receiver module includes: a decoder module connectable to a receiver that is capable of receiving distress signals broadcasted by another subscriber vehicle. The decoder module is responsive to the received distress signal, for decoding it and generating a corresponding notification signal. In this regard the controller is adapted for communicating the notification signal together with position data, to the control center via the wireless communication network.

According to another broad aspect of the present invention there is provided a vehicle tracking system for installation in a vehicle, which is a subscriber of the vehicle tracking network. The vehicle tracking system includes a wireless communication module configured and operable for wireless communication with a wireless communication network, a positioning system that is capable of determining a position of the vehicle, and a controller connectable to the wireless communication module and to the positioning module. The controller is configured and operable for operating the wireless communication module for communicating vehicle data, including data indicative of an identification of said vehicle and data indicative of said position of the vehicle to the control center via said wireless communication network. The controller is also adapted to identify jamming of at least one of: (i) the positioning system and (ii) the wireless communication module. Upon identifying of such jamming, the controller is adapted to operate an RF transmitter for broadcasting a distress signal encoding a data indicative of a condition of the vehicle. The distress signal is encoded such that it is detectable by one or more subscriber vehicles of the vehicle tracking network which are located in the vicinity of the vehicle, to thereby initiate automatic notification of the vehicle condition from the one or more subscriber vehicles to the control center.

According to another aspect of the invention there is provided a vehicle tracking system that is configured for installation in a vehicle being a subscriber or a member of the vehicle tracking network. The vehicle tracking system includes a network communication module that is configured and operable for communication with said control center via a wireless communication network, a positioning system capable of determining a position of the vehicle, and a controller connectable to the network communication module and to the positioning system and configured and operable for operating the network communication module for communicating with the control center. The controller includes a vehicle tracking receiver module that is adapted for operating a radio frequency (RF) receiver to detect and receive one or more encoded distress signals broadcasted by one or more subscriber vehicles of the vehicle tracking network. Upon receiving an encoded distress signal broadcasted by a certain subscriber vehicle, the controller is adapted for carrying out the following:

decoding the distress signal and generating a corresponding notification indicative of a condition of the certain subscriber vehicle;

obtaining position data estimating the location of the certain subscriber vehicle. The position data may be obtained from the positioning system which is on board the vehicle receiving the distress signal and/or it may be encoded in the distress signal; and operating the network communication module for communicating the notification (indicative of the condition and the estimated location and/or heading of the certain subscriber vehicle) to the control center via the wireless communication network.

According to yet another broad aspect of the present invention there provided a system for tracking vehicles. The system includes: a database configured and operable for storing data on a plurality of subscriber vehicles, being subscribers to a vehicle tracking network, a network module adapted for communicating with the subscriber vehicles via a wireless communication network, and a control system. The control system is configured and operable for receiving data indicative of signals received from the wireless communication network. The control system is adapted to identify in such data, any notification that has been received from a subscriber vehicle and that includes data indicative of a distress signal which originated and was broadcasted by another subscriber vehicle. The control system is adapted to process the notification data received from the subscriber vehicle to determine data identifying the other subscriber vehicle and data estimating a position of the other subscriber vehicle, to thereby enable tracking the position of the other subscriber vehicle utilizing notification data obtained from one or more subscriber vehicles of the vehicle tracking network.

According to yet another aspect of the present invention there is provided a method for tracking a vehicle, which is a subscriber to a vehicle tracking network comprising a plurality of subscriber vehicles and a control-center. The method includes carrying out the following in the subscriber vehicle to be tracked:

monitoring the operation of one or more services related to at least one of a wireless network communication service and positioning service associated with the subscriber vehicle;

upon detecting a failure in at least one of these services generating a distress signal encoded to be identifiable by subscriber vehicles of the vehicle tracking network;

broadcasting the encoded distress signal such that it is detectable by one or more subscriber vehicles of the vehicle tracking network, which are located in the vicinity of the vehicle, to thereby initiate automatic notification of the vehicle condition from the one or more subscriber vehicles to the control center.

According to yet a further aspect of the invention there is provided a method for tracking vehicles which are subscribers to a vehicle tracking network comprising a plurality of subscriber vehicles and a control-center. The method includes carrying out the following in a subscriber/member vehicle of the vehicle tracking network (e.g. in a plurality of member vehicles) for tracking other subscriber vehicles of the vehicle tracking network:

operating a receiver for receiving another vehicle's distress signal broadcasted by another subscriber vehicle of the vehicle tracking network which is located in the vicinity of the vehicle;

in response to receiving the distress signal from the another vehicle, decoding the another vehicle's distress signal and generating a corresponding notification signal; and communicating the notification signal together with position data about said another subscriber vehicle, to the control center via a wireless communication network.

According to another broad aspect of the present invention there is provided a method for tracking vehicles. The method includes carrying out the following at a control system of a vehicle tracking network:

storing data on a plurality of vehicles, which are subscribers to a vehicle tracking network;

communicating with one or more subscriber vehicles via a wireless communication network to receive, from a subscriber vehicle: notification data indicative of a distress signal, that was detected by the subscriber vehicle and that originated and was broadcasted by another subscriber vehicle of the vehicle tracking network in response to jamming of at least one of: (i) a positioning system associated with the another subscriber vehicle, and (ii) a wireless communication between the another subscriber vehicle and the control center. The notification data includes position data indicative of an estimated position of the another subscriber vehicle; and processing the data indicative of the distress signal to determine data identifying the another subscriber vehicle and data estimating the position of the another subscriber vehicle to thereby enable tracking the position/route of the another subscriber vehicle by utilizing data obtained from one or more of the vehicle members of the vehicle tracking network.

Thus, the present invention provides novel systems and methods for tracking vehicles that are subscribers to a vehicle tracking network, even in cases where receivers such as RF receivers in these vehicles are being jammed. The systems and methods of the present invention facilitate real time establishment of an ad-hoc uni-lateral communication network channel enabling one-directional communication of the condition of the vehicle from the jammed vehicle to a security service provider associated therewith. Also, the present invention provides several techniques for utilizing the vehicle tracking network for determining/estimating the position (i.e. the location and/or the heading) of the jammed vehicle, even in cases where the positioning system on board the vehicle is jammed. Further features and advantages of the present invention are described in more detail in the description section below.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A is a schematic illustration of a vehicle tracking network according to an embodiment of the present invention including a control-center for a plurality of subscriber vehicles;

FIG. 2B is a flow chart of illustrating a method according to some embodiments of the present invention for tracking vehicles by a control center of a vehicle tracking network;

DETAILED DESCRIPTION OF EMBODIMENTS

Figure 1:
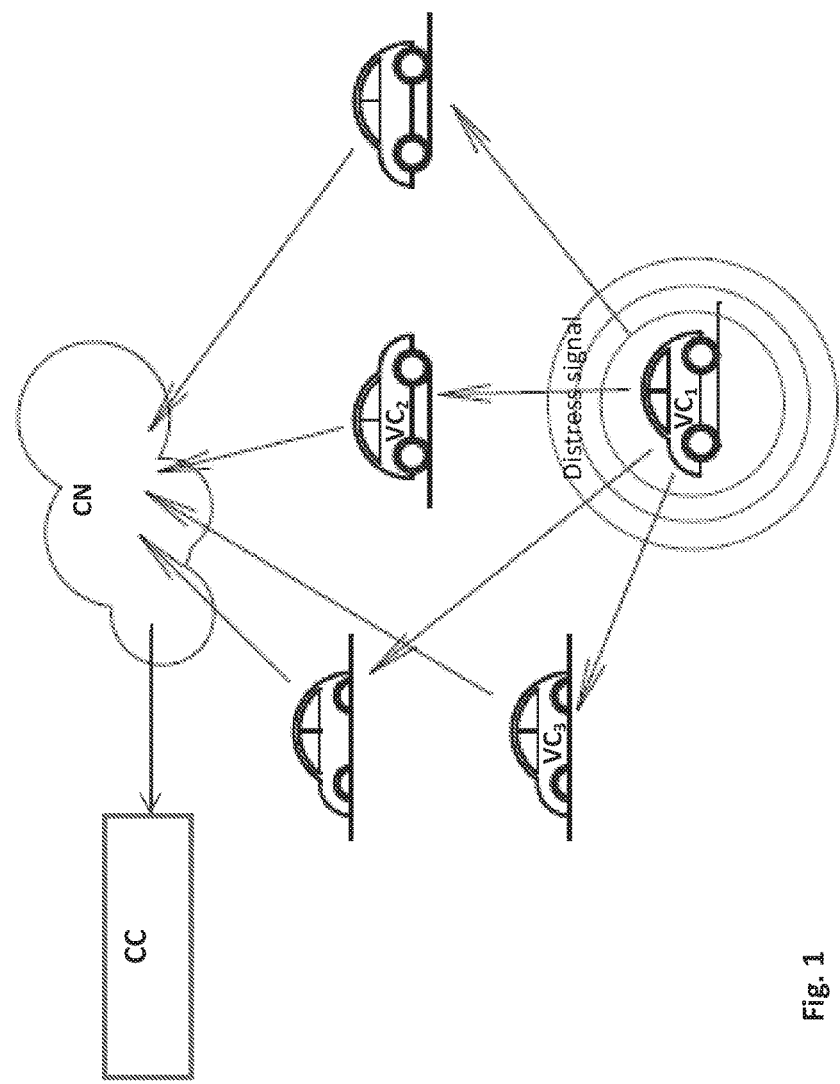
FIG. 1 is a schematic illustration of a vehicle tracking network according to an embodiment of the present invention including a control-center for a plurality of subscriber vehicles.

Reference is made to FIG. 1 illustrating, in a self explanatory manner, a uni-directional established ad-hoc communication between a subscriber vehicle $VC_1$, being a subscriber to a vehicle tracking network of the present invention, which broadcasts a distress signal, and a control center CC of the vehicle tracking network, which monitors the subscriber vehicle $VC_1$ (as well as other subscriber vehicles). Upon detection, at vehicle $VC_1$, that its receiver is being jammed, it transmits a distress signal. As illustrated in the figure, an ad-hoc communication is established by utilizing communication devices installed in one or more vehicles (e.g. $VC_2$ and $VC_3$), which happen to be in the vicinity of the vehicle $VC_1$ broadcasting the distress signal, and which are subscribers (members) of the vehicle tracking network. According to the present invention, the vehicles, which are subscribers of the vehicle tracking network are, typically, furnished with equipment allowing them to detect the distress signal broadcasted by other subscriber vehicles, such as vehicle $VC_1$ in the present example, and convey a corresponding notification to the control center CC via a wireless communication network (typically cellular network and/or satellite communication network). Accordingly, an ad-hoc uni-lateral communication is established between the subscriber vehicle $VC_1$, which is being jammed, and the control center CC, informing the control center about the state of the jammed vehicle $VC_1$.

Turning now to FIG. 2A, there is illustrated in more detail a vehicle tracking network according to an embodiment of the present invention including a control-center CC facilitated with a vehicle tracking system 100A configured and operable according to the invention and a plurality of subscriber/member vehicles (e.g. $VC_1$-$VC_n$). The plurality of subscriber vehicles $VC_1$-$VC_n$ of the vehicle tracking network are typically installed with a tracking controller (not shown in the figure) that is adapted for communicating with the control center CC via a wireless communication network (typically cellular network and/or optionally a satellite based communication network). Also, a subscriber vehicle $VC_1$-$VC_n$ is typically furnished with a positioning system (not shown in the figure) that is adapted to obtain data indicative of the position of the vehicle (e.g. its location and/or it orientation). The positioning system may include for example one or more of the following: a global positioning system (GPS) adapted to determine the vehicle's location and/or orientation from signals received from the GPS network, a cellular network based positioning system (e.g. providing an estimated position based on communication with a cellular network), and/or other positioning electronics such as inertial devices (accelerometers/gyros) and/or a compass module at the vehicle.

During normal operation, the tracking controller in a subscriber vehicle $VC_1$ is adapted for receiving positioning data from the positioning system, indicative of the location and possibly also orientation of the subscriber, and communicating such positioning data together with data identifying the vehicle to a vehicle tracking system 100A in the control center CC via the wireless/cellular communication network. The vehicle tracking system includes a control system 110, a data storage 130 (e.g. database) storing data of the subscriber vehicles, and a communication module 120 that is operable for communicating with the subscriber vehicles $VC_1$-$VC_n$ via the wireless communication network (via cellular networks). The data storage 130 is typically configured and operable for storing, for each of the subscriber vehicles of the vehicle tracking network, vehicle identification data including one or more identifiers of the vehicle, communication data for use in communicating with the subscriber vehicle and subscription agreement data/properties associated with the services to be provided to the subscriber vehicle. The subscription agreement may optionally indicate the subscription type of the vehicle (e.g. whether it is a regular subscriber or a premium subscriber and/or optionally the type of vehicle tracking system installed in the vehicle). The control system 110 is connectable to the data storage 130 and the communication module 120 and is configured and operable for utilizing the data stored in the data storage for monitoring and/or tracking the subscriber vehicles e.g. $VC_1$-$VC_n$ by communicating with the tracking controllers thereof over the wireless/cellular network (utilizing the communication module 120) and receiving therefrom data indicative of their locations and/or orientations. In some embodiments the monitoring is performed for all the subscriber vehicles, while in some embodiments the monitoring is performed for only some of the subscriber vehicles, for example for only those vehicles which are currently active/being driven and/or only for certain vehicles which are suspected to be stolen and/or lost.

Thus, as long as normal operation of the system is not disrupted, the subscriber vehicles $VC_1$-$VC_n$ (at least those which are in operative-state/currently-driving) can be monitored and tracked by the system 100A. However, this normal mode of operation of the system 100A functions properly only as long as the communication modules and the positioning systems onboard the monitored vehicles are not disrupted and are operating properly. In case a failure/misoperation occurs in the wireless communication from the subscriber vehicle $VC_1$ with the wireless network and/or in the positioning system of the subscriber vehicle $VC_1$ (i.e. when the operation of the wireless communication or the positioning system is disrupted/jammed), this normal operation mode may fail to provide the real time location of the vehicle received from the positioning system (e.g. GPS) to the control center (system 100A). For example, upon malicious jamming of the wireless network communication services and/or positioning services to the vehicle by vehicle thieves, the position of the subscriber vehicle system 100A may 'fail to receive' when using the normal operational mode. Therefore, according to the present invention, the system 100A is also adapted for operating in a second mode, hereinafter distress mode and/or jammed vehicle mode, for obtaining the location (e.g. an estimated location) and possibly also the orientation of a subscriber vehicle $VC_1$, in which operation of one of the vehicle's wireless communication module and/or the vehicle's positioning system is disrupted and/or jammed. As will be further described in more detail below, in such cases the tracking controller in the subscriber vehicle $VC_1$ is adapted to detect the disruption/jamming (i.e. generally failure) of the positioning system and/or of the wireless communication module of the subscriber vehicle $VC_1$ and initiate a broadcast of a distress signal from the subscriber vehicle $VC_1$ such that the distress signal can be detected and received by other subscribers of the vehicle tracking network. The distress signal is typically encoded data identifying the jammed/distressed subscriber vehicle $VC_1$, and possibly, if available, to the vehicle $VC_1$, also data indicating the vehicle's position (location and/or orientation). Additionally, in some embodiments the distress signal may also be encoded with data indicative of the operational state of the vehicle $VC_1$, such as its ignition status (on/off) and speed, and possibly also data indicating the intensity at which the distress signal is to be transmitted. The subscribers of the vehicle tracking network detecting the distress signals may be one or more of the vehicles $VC_2$-$VC_n$ which are located in the vicinity of the disrupted/jammed subscriber vehicle $VC_1$ (e.g. up to few hundred meters therefrom to a few kilometers therefrom). Upon detection of the distress signal broadcasted from the disrupted vehicle $VC_1$, by another subscriber vehicle, such as $VC_2$, the tracking receiver module of the another subscriber vehicle $VC_2$ operates to decode the distress signal and automatically initiates a notification to the control center indicating the condition of the disrupted/jammed subscriber vehicle $VC_1$. More particularly, the tracking receiver module of the subscriber vehicle $VC_2$ may initiate notification including data indicative of the identification of the jammed vehicle $VC_1$ (e.g. unit ID/licensing number and/or other identifier of the $VC_1$) as well as data indicative of the position of the jammed vehicle, and send such a notification to the control center CC. Moreover, in some embodiments of the present invention, the tracking receiver module may also include data indicative of the operational state of the jammed vehicle $VC_1$ (e.g. its ignition status and speed) in the notification data, as long as such data pieces are obtained/encoded in the distress signal received from jammed vehicle $VC_1$. Additional data pieces may be included in the notification communicated from $VC_2$ to the control center. For example the signal strength at which the distress signal (e.g. being an RF broadcast from $VC_1$) is received at vehicle $VC_2$ and the time at which the distress signal was first detected by vehicle $VC_2$ and/or the time at which it ceased being detected by vehicle $VC_2$.

In this connection, it should be noted that in some embodiments of the present invention, two or more notifications relating to the received distress signal may be communicated to the control center from $VC_2$. For example, a first notification may be communicated upon initial receipt/detection of the distress signal by $VC_2$, while encoding the strength of the detected distress signal and possibly also the time of its detection, and another (e.g. second/last) notification may be communicated after the distress signal is no longer detected by $VC_2$ (e.g. when $VC_1$ has left the vicinity of $VC_2$), also encoding the strength of the last detection of the distress signal and it time. Also, in some embodiments additional (e.g. periodic) notifications may be communicated from $VC_2$ to the control center for as long as the distress signal is received by $VC_2$ (these may also encode the distress signal strength). As will be appreciated by those versed in the art, information relating to the timing and/or strength of the detection of the distress signal from the during the time it is received by $VC_2$, combined with information on the position (location and/or heading) and of $VC_2$ and optionally also the speed of $VC_2$ (which may also be communicated in the notification(s) to the to the control center), may be used by the control center and/or by the vehicle tracking receiver module on boards $VC_2$, to estimate, with better accuracy, the position of $VC_1$, and/or its heading and/or its speed.

As will be further described below, identification data of the disrupted vehicle $VC_1$ may be encoded in the distress signal broadcasted from the vehicle, and may be encrypted or not. The position data may include the location of the disrupted vehicle $VC_1$ and may be obtained/encoded in the distress signal from the disrupted vehicle $VC_1$, while being also encrypted or not. Alternatively or additionally, the position data may be obtained from positioning system of the vehicle $VC_2$ receiving the distress signal. Because the distress signal is typically detectable by subscriber vehicles located within limited distance from the distress signal transmission (e.g. typically up to hundreds of meters and generally not exceeding about 1 km), the positioning of the vehicle $VC_2$ receiving the distress signal may be used as an accurate enough estimate to the position of the disrupted vehicle $VC_1$.

In this connection, it should be noted that the terms position and positioning are used herein with their general meaning to refer to the location of a vehicle, orientation of a vehicle and/or to both the location and the orientation of the vehicle. In some embodiments of the present invention the orientation/heading of the disrupted vehicle $VC_1$ is provided/encoded in the distress signal broadcasted from the vehicle $VC_1$. Orientation of the disrupted vehicle $VC_1$ may, for example, be determined by the tracking controller onboard the disrupted vehicle $VC_1$ by utilizing a compass module and/or an inertial system of gyros and/or accelerators onboard the vehicle. Since the operation of such systems is typically independent of receipt of external signals, they are therefore less susceptible to conventional jamming techniques and may be reliably used for providing data estimating the orientation/heading of the disrupted subscriber vehicle $VC_1$ even in cases where its communication and/or GPS systems are being jammed. Indeed generally, the location of the disrupted vehicle $VC_1$ may generally also be determined by the tracking controller that is onboard the disrupted vehicle $VC_1$, for example by utilizing positioning systems such as GPS based positioning systems (e.g. the American GPS satellite network and/or the Russian GLONAS satellite network), and/or inertial navigation systems in the vehicle, and/or cellular network based positioning systems which may be used for obtaining approximate/rough location of the vehicle, based on its cellular network ID (known as Cell ID) with which a cellular communication module in the vehicle communicates. Accordingly, in some embodiments of the present invention in case positioning systems onboard the disrupted vehicle $VC_1$ are not jammed, location of the vehicle may be provided therefrom and encoded in the distress signal broadcasted by the disrupted vehicle $VC_1$. However, it is noted that GPS based positioning systems, as well as cellular network based positioning systems, are generally susceptible to conventional jamming techniques. On the other hand, inertial navigation systems for providing location are typically costly and are rarely installed in regular vehicles. Therefore, alternatively or additionally in some embodiments of the present invention, the location of the disrupted subscriber vehicle $VC_1$ may be estimated by utilizing a positioning system, which is on board the vehicle $VC_2$ that receives the distress signal. Utilizing the location of the vehicle $VC_2$ receiving the distress signal as an estimation of the location of the jammed/disrupted subscriber vehicle $VC_1$ facilitates reliable and cost effective positioning of the subscriber vehicle $VC_1$ even in cases where its positioning systems are jammed.

Thus, in view of the above, according to the present invention, the vehicle $VC_2$ receiving the distress signal from the disrupted subscriber vehicle $VC_1$ may obtain data indicative of the identification of the disrupted vehicle $VC_1$ and possibly also data indicating the orientation of the disrupted vehicle $VC_1$ by the distress signal broadcasted by disrupted vehicle $VC_1$, and also obtain data indicative of the location of the disrupted vehicle $VC_1$ (e.g. via the distress signal or locally from the positioning system on-board $VC_2$). The vehicle tracking receiver module of the distress signal receiving vehicle $VC_2$ may be adapted for communicating notification with the identification and the position of the disrupted vehicle $VC_1$ to the control center via the wireless network (which generally should not be jammed at the vehicle $VC_2$). The data obtained via the distress signal, or portions thereof, may optionally be encrypted, and the vehicle tracking receiver module in the subscriber vehicle $VC_2$ may be adapted to decrypt such data, before including it in the notification which is sent to the control center, or it may be adapted for sending the encrypted data to the control center, where it will be subsequently decrypted.

Thus, the second mode, disrupted/jammed mode, of operation, according to the present invention, allows for utilizing a network formed by the plurality of member/subscriber vehicles for monitoring and tracking the locations and/or orientations of one or more of the subscriber vehicles even in cases of jamming of the onboard communication and/or positioning systems of these one or more subscriber vehicles. To this end, according to some embodiments of the present invention, the system 100A at the control center CC is adapted for implementing the method 100B as illustrated in the flow chart of FIG. 2B.

According to this method (100B), the control system 110 is adapted for carrying out operation 150 of method 100B for operating the communication module 120 to communicate with the subscriber/member vehicles $VC_1$-$VC_n$ via the wireless communication network (which may typically be cellular network(s)). The list of subscriber/member vehicles $VC_1$-$VC_n$, with which the system 100A should communicate and their communication addresses (e.g. their telephone numbers/email addresses and/or any other communication network addressed used for communication with the controllers on board the subscriber vehicles), is generally provided from the data storage 130.

In the normal mode of operation, when the vehicle is not jammed (e.g. $VC_2$), it communicates its location back to the control system 110. However, in case a subscriber vehicle is jammed (e.g. $VC_1$ which positioning system and/or the wireless network communication system/capabilities are jammed), its tracking controller operates in the second mode and transmits a distress signal to be received by other members/subscriber vehicles in its vicinity (e.g. By $VC_2$). In turn, the controller in a member vehicle $VC_2$ receiving the distress signal, operates to automatically communicate a notification of the received distress signal to the control center CC via the wireless/cellular communication network. System 100A of the control center receives the notification and, responsive to the notification, carries out operations 160 to 180 of method 100B.

Operation 160 includes receiving notification data indicative of a distress signal broadcasted by a certain (jammed) subscriber vehicle (e.g. $VC_1$) and detected by at least one member/subscriber vehicle (e.g. $VC_2$) via the wireless communication network. Receipt of this notification data may be performed utilizing communication module 120 and based on normal wireless communication with the vehicle $VC_2$, which is not jammed.

In operation 170, the control system 110, which may be configured as a computerized system equipped with a processor and a memory, processes the notification data received from the vehicle $VC_2$ to determine data identifying the jammed subscriber vehicle $VC_1$ and also to determine data estimating the position (at least the estimated location and preferably also the estimated orientation/driving-direction/heading) of the jammed subscriber vehicle $VC_1$.

To this end, in some embodiments of the present invention, the notification data may include encrypted data. For example the notification data may include data (such as an identifier of vehicle $VC_1$ and/or positioning data from $VC_1$) that have been encrypted already in the distress signal transmitted by the jammed subscriber vehicle $VC_1$ and not decrypted by the distress signal receiving vehicle $VC_2$, and/or it may include data (such as positioning data) encrypted by the vehicle $VC_2$. The encryption may be performed utilizing a certain predetermined encryption key, which may be associated with all the members/subscribers of the vehicle tracking network, and/or utilizing a specific encryption key that is respectively associated with the jammed subscriber vehicles (e.g. $VC_1$) and/or utilizing a specific encryption key associated with the subscriber/member vehicle $VC_2$, which received the distress signal. In optional operation 172, which is typically performed in case some of the notification data is encrypted, the control system 110 operates to retrieve a respective predetermined decryption key (e.g. from data storage 130) and utilize that decryption key to decrypt the encrypted portions of the notification data. The decryption key is generally complementary to the encryption key used and/or it may be similar thereto. In some embodiments different decryption keys are stored in the data storage 130 in association with different subscriber/member vehicles respectively, and the control system 110 operates to select the suitable decryption key based on the identity of the jammed vehicle $VC_1$ and/or based on the identity of the distress signal receiving vehicle $VC_2$, all in accordance with the vehicle that had encrypted the data. Alternatively or additionally in some embodiments a certain decryption key is used commonly for all the subscriber vehicles, and that control system 110 may be adapted to retrieve that decryption key from a memory thereof and/or from the data storage 130.

In operation 174 an estimated location of the jammed vehicle $VC_1$ is obtained/determined from the notification data. The estimated location may actually be the location of the distress signal receiving vehicle $VC_2$, which may provide a good estimation of the location of the vehicle $VC_1$ since the distress signal is typically received at no more than a distance of few hundred meters from the transmitting vehicle $VC_1$. Alternatively or additionally, the estimated location of the jammed vehicle $VC_1$ may be a location obtained by the positioning system of vehicle $VC_1$ itself (in case this positioning system is not jammed) and transmitted via the distress signal to the vehicle $VC_2$.

In optional operation 176 an estimated orientation (driving direction) of the jammed vehicle $VC_1$ is obtained/determined from the notification data. The estimated orientation of the jammed vehicle $VC_1$ may be an orientation of the vehicle $VC_1$ obtained by the positioning system of vehicle $VC_1$ itself (in case this positioning system is not jammed) and transmitted via the distress signal to the vehicle $VC_2$. Alternatively or additionally, the estimated orientation of the jammed vehicle $VC_1$ may be an orientation of the vehicle $VC_1$ obtained from a compass module located onboard $VC_1$ and transmitted via the distress signal to the vehicle $VC_2$. Yet alternatively or additionally, the estimated orientation may actually be an orientation of $VC_1$ estimated by a controller onboard the distress signal receiving vehicle $VC_2$. For example, in the latter case, the controller of $VC_2$ may utilize the detection of the distress signal to estimate the relative orientation between vehicles $VC_2$ and $VC_1$, and, utilizing a positioning system and/or a compass onboard $VC_2$, to determine the absolute orientation of $VC_2$. The absolute orientation of $VC_2$ plus the relative orientation between $VC_1$ and $VC_2$, may provide an indication of the absolute orientation of $VC_1$. Accordingly data indicative of the orientation of $VC_1$ may be included in the notification data transmitted to the control system 110. In this connection it should be noted that the relative orientation between $VC_1$ and $VC_2$ may be determined from onboard the distress signal receiving vehicle $VC_2$ by utilizing any number of possible techniques. For example, in $VC_2$, by monitoring the change in the intensity of the received distress signal as a function of time, the change in the relative distance between $VC_2$ and $VC_1$ may be estimated, and thus it may be determined if $VC_1$ moves/drives in about the same direction as $VC_2$ (in which case the distance between $VC_1$ and $VC_2$ is maintained to be relatively constant and thus also the distress signal's intensity) and/or in about the opposite direction to distress signal receiving vehicle $VC_2$ (in which case the distance between $VC_1$ and $VC_2$ changes with time in accordance with the relative velocity between the vehicles, and thus also the distress signal's intensity changes in time). In addition, in some cases a navigation map may be used in conjunction with estimation in the relative distance between $VC_2$ and $VC_1$ to determine possible routes in the vicinity of $VC_2$, at which $VC_1$ may be located, and to estimate its direction along these routes, which may provide the time profile of the intensity of the distress signal received from $VC_1$ (e.g. this may be processed by considering the location and speed of $VC_2$). In yet another option, utilizing multiple receivers (two or more receiving antennas) onboard $VC_2$ may provide direction estimation for the origination of the signal of $VC_1$ and accordingly the driving direction of $VC_1$ can be tracked.

Also, in some embodiments of the present invention, the orientation of $VC_1$, may be inferred by the control system 110 itself from notification data that may be obtained with regard to $VC_1$ from multiple subscriber/member vehicles (e.g. from $VC_2$, and then from $VC_3$). By knowing/obtaining the locations of these vehicles, $VC_2$ and $VC_3$, and the time they communicate their respective notifications on the distress signals received thereby from $VC_1$, the heading (drive direction) of $VC_1$ may be inferred.

Alternatively or additionally, as indicated above, a vehicle tracking module in a member/subscriber vehicle $VC_2$ may be adapted to communicate several (e.g. periodic) notifications indicating receipt of a distress signal thereby to the control center CC. The notification may indicate the signal strength and the timing of the received distress signal, and possibly also the speed location and heading of the vehicle $VC_2$. By processing this information, possibly utilizing additional/predetermined information for example relating to the strength at which the distress signal is transmitted by $VC_1$, the control system 110 may estimate the distance between $VC_1$ and $VC_2$ and/or their relative velocity (e.g. based on the known in the art relation that signal intensity is inversely proportional to the square of the distance from the signal source). Accordingly, by utilizing the thus determined distance and/or relative-velocity between $VC_1$ and $VC_2$ and utilizing additional information relating to the speed, location and/or heading of $VC_2$ (which may also be included in the notification from $VC_2$), the speed, location and/or heading of $VC_1$ may be determined/estimated by the control system 110 with good accuracy.

Operations 150 to 170 provide indication of the jammed vehicle and its positioning (its location, and possibly also its orientation). Optionally in operation 180 the jammed vehicle is tracked/monitored by repeating the operations 150-170 with other member vehicles which detect the distress signal transmitted by the jammed subscriber vehicle. For example, the route of the jammed vehicle may be determined by the control system 110, by utilizing notification data received from the plurality (two or more) of the subscriber vehicles which pass in the vicinity of the jammed vehicle and receive its distress signal.

Figure 3A:
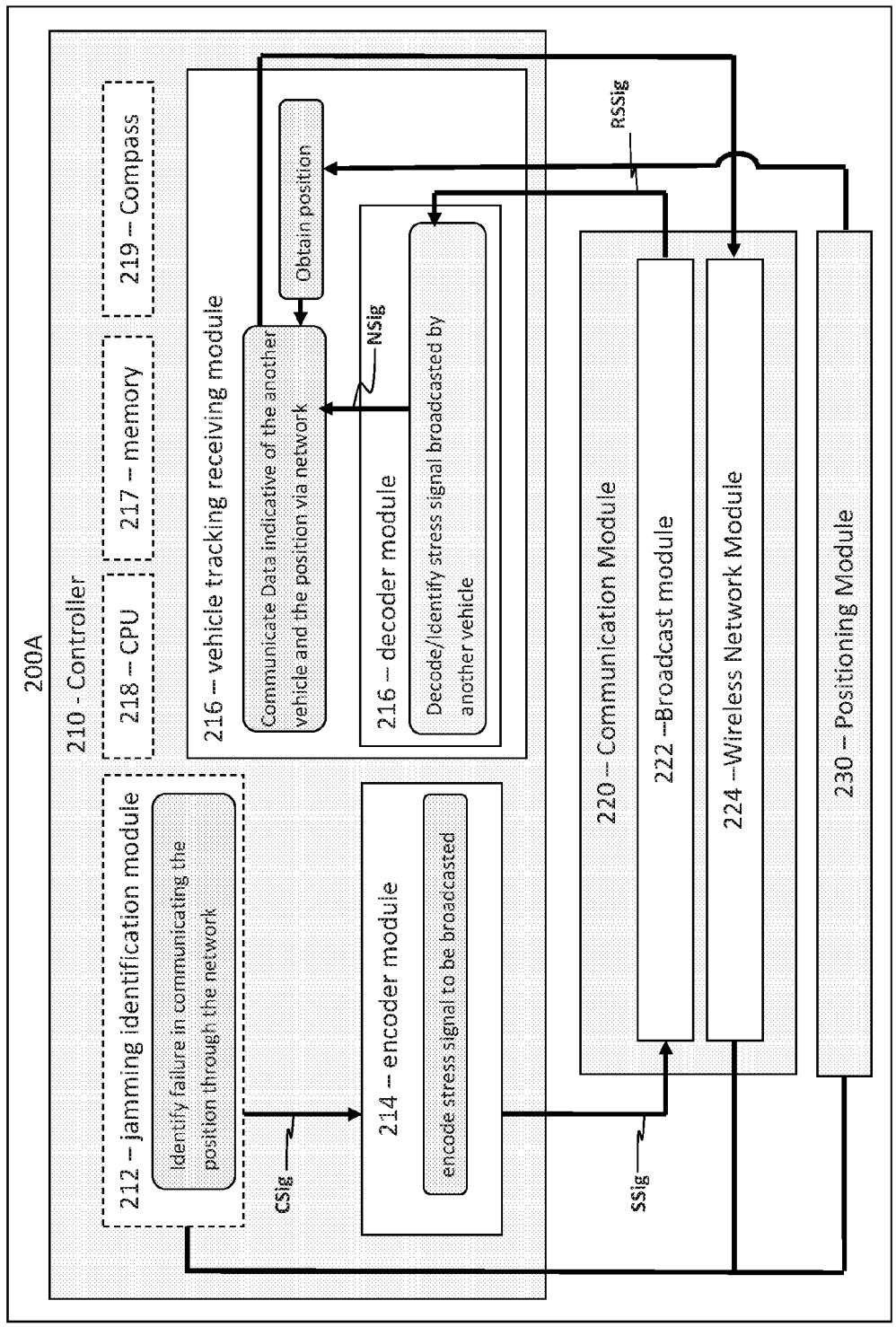
FIG. 3A is a block diagram schematically illustrating a tracking system configured and operable according to some embodiments of the present invention for installation at a subscriber vehicle, being a subscriber to a vehicle tracking network.
Figure 3B:
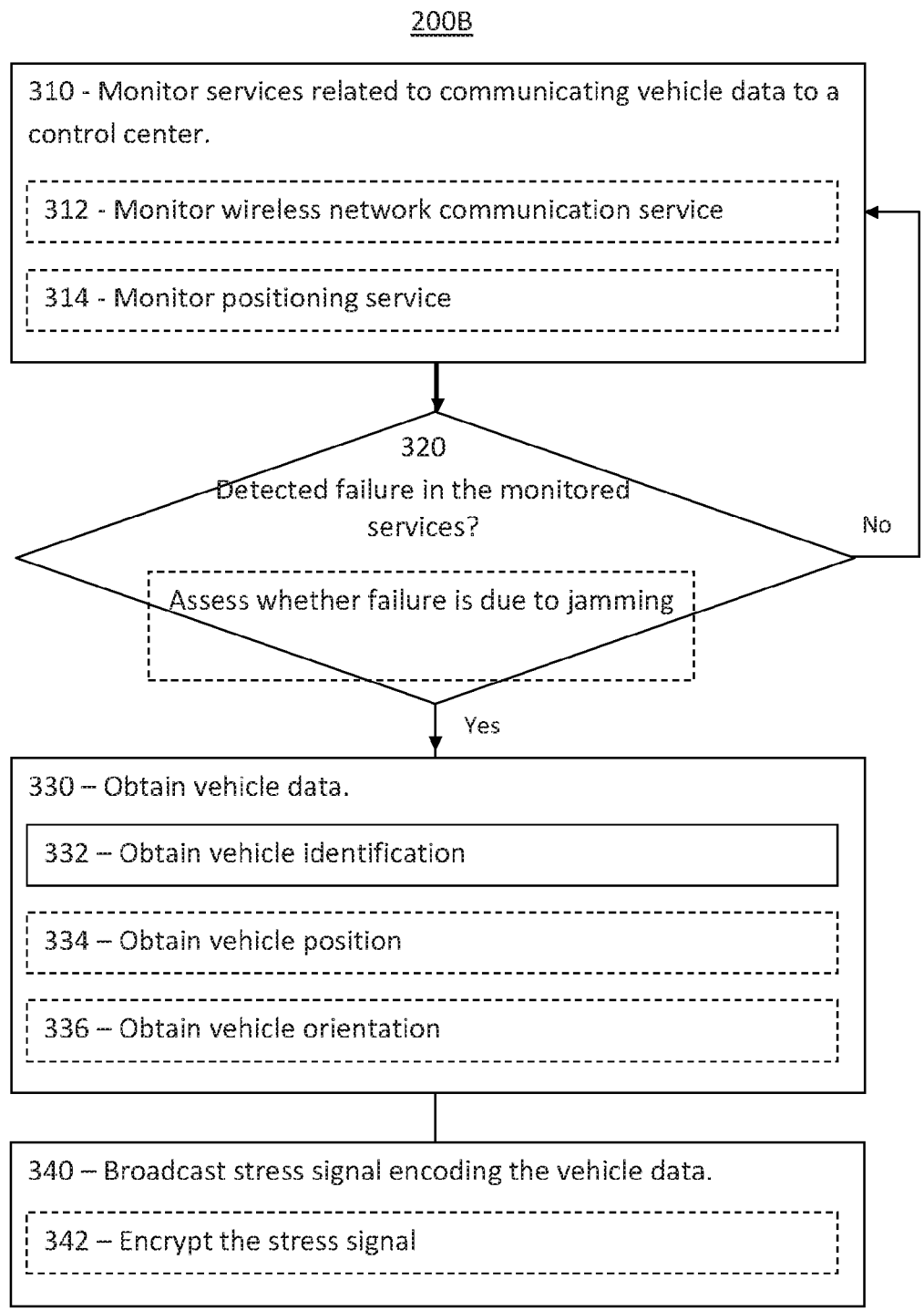
FIG. 3B is a flow chart illustrating a method operable at a subscriber vehicle for tracking a subscriber vehicle in cases where the communication and/or positioning systems of the subscriber vehicle are jammed.
Figure 3C:
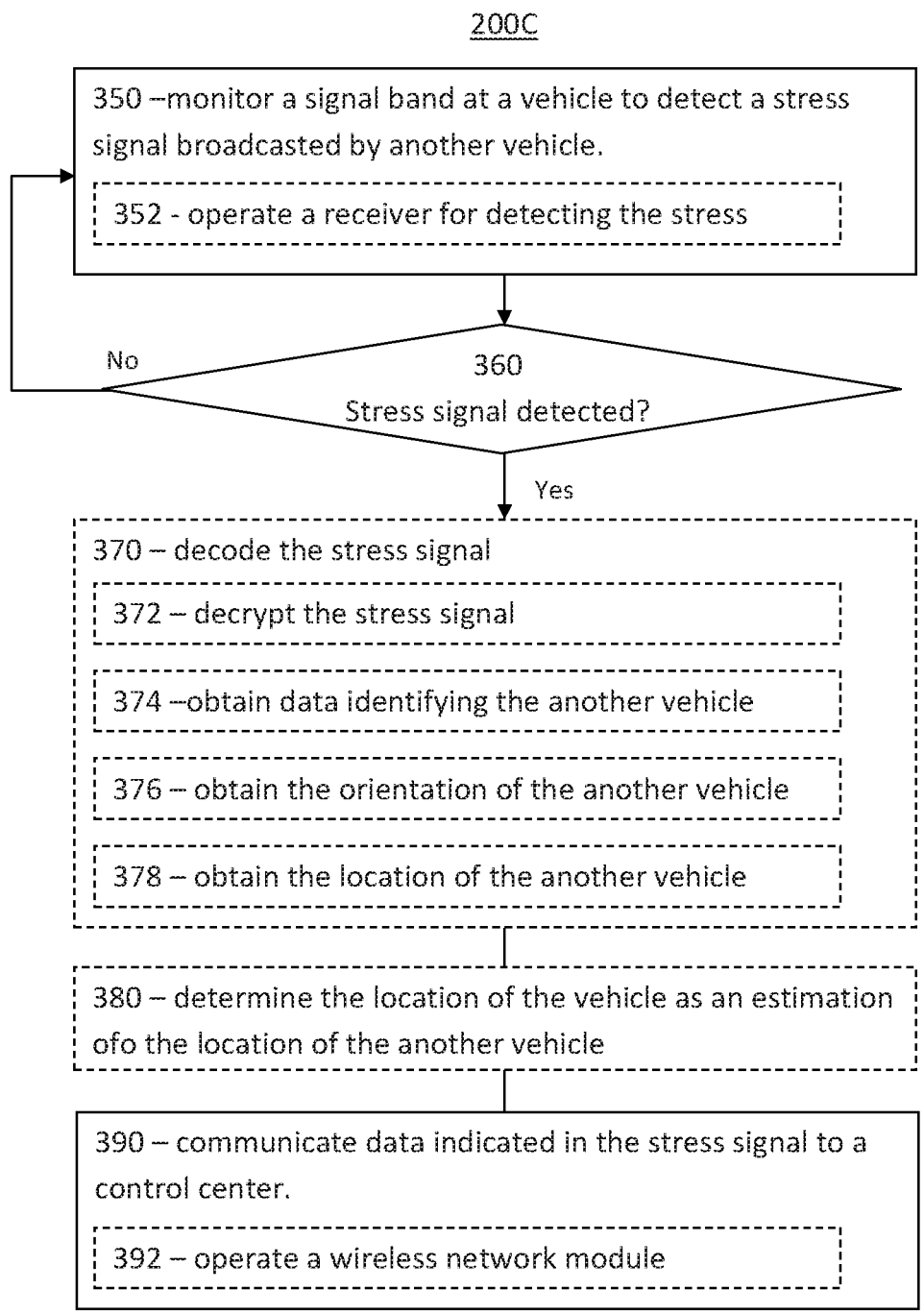
FIG. 3C is a flow chart illustrating a method operable at a subscriber vehicle for tracking of a second subscriber vehicle in the vicinity of the subscriber vehicle in cases where the communication and/or positioning systems of the second subscriber vehicle are jammed.

Reference is made together to FIGS. 3A, 3B and 3C respectively illustrating a tracking system 200A and methods 200B and 200C of operation thereof according to some embodiments of the invention. FIG. 3A is a block diagram 200A schematically illustrating a tracking system configured and operable for installation in a subscriber vehicle according to the invention. FIG. 3B is a flow chart 200B of a method of operation of a tracking system (e.g. system 200A) allowing the tracking of the subscriber vehicle, in which the system is installed, also in cases where the subscriber vehicle is jammed by application of communication jamming in its vicinity. The system 200A enables both the broadcasting of distress signals by the subscriber vehicle at which it is installed and also the receipt of signals which are broadcasted by other subscriber vehicles by the vehicle in which it is installed. FIG. 3C is a flow chart 200C of a method of operation of a tracking system (e.g. system 200A) allowing the tracking of a jammed subscriber vehicle located in the vicinity of the subscriber/member vehicle in which the system is installed, to allow tracking of the jammed subscriber vehicle by the control center.

The tracking system 200A is configured for installation in a vehicle (e.g. $VC_1$) which is a subscriber to a vehicle tracking network comprising a plurality of subscriber/member vehicles $VC_1$ to $VC_n$ and a control-center CC. The tracking system 200A includes a controller 210 connectable to a wireless communication module 220 and adapted for operating the wireless communication module 220 for communicating vehicle data associated with the vehicle $VC_1$ to the control center CC via a wireless communication network. The controller 210 is associated with a jamming identification module 212 configured and operable to identify failure in the communication of vehicle data to the control center CC and upon identifying the failure, generating a control signal CSig indicative of a condition of the vehicle $VC_1$. The jamming identification module 212 may or may not be a part of the system of the present invention and in some embodiments it is an external utility being part-of, or is associated with the cellular network modem and/or the GPS receiver. The controller 210 includes an encoder module 214 that is configured and operable to be responsive to the control signal CSig from the jamming identification module 212 for generating a corresponding distress signal SSig encoded to be identified by one or more of the other member/subscriber vehicles $VC_2$ to $VC_n$, which are located in the vicinity of the vehicle $VC_1$.

The tracking system 200A is generally capable of operating in a normal mode of operation, in case no jamming/disruption is applied to its related positioning and communication modules, 230 and 220, for communicating vehicle data (e.g. including the vehicle's identifier and/or the vehicles positioning data) to the control center CC. Additionally, system 200A is also configured and operable for implementing the operations of method 200B for detecting jamming/disruption of this normal mode of operation and accordingly performing operations enabling the control center to track the vehicle even in cases where communication via the wireless/cellular network is jammed and/or the positioning system is jammed.

The jamming identification module 212 is connectable to the wireless communication module 220 and to the positioning system 230 and is adapted to identify failures in the operation thereof preventing the communication of vehicle data to the control center. In other words, the jamming identification module 212 may be adapted for implementing operation 310 of method 200B to monitor services related to communicating vehicle data to a control center, and in particular monitor the wireless network communication service (operation 312) and/or monitor the positioning service (operation 314). The jamming identification module 212 is operable in accordance with operation 320 for detecting failures in those services. For instance in some embodiments of the present invention the jamming identification module 212 may be adapted to identify jamming of the communication of wireless communication module 220 with the wireless network and/or jamming of the positioning system 230 preventing the retrieval of positioning data of the vehicle. As will be readily appreciated by those skilled in the art, the jamming module 212 may be configured and operable in accordance with any suitable technique for identifying jamming as known in the art. Various techniques for jamming identification are described for example in U.S. Pat. No. 8,319,615, U.S. patent application publication No. 2004/005858, and in U.S. patent application publication No. 2013/217353. Optionally, upon detection of failure in the monitored services, the failure characteristics may be processed to assess if the failure is caused by jamming (e.g. by malicious jamming) and/or if it is caused by temporary network failure (e.g. mis-coverage). For example identifying the failure in the network communication and/or the positioning system with jamming may be achieved by persistent detection/monitoring of failures that persist for a time duration longer than a certain predetermined time threshold; and/or utilizing conventional techniques referred to above.

More specifically, in some embodiments of the present invention, an internal cellular modem of the wireless network module 224, is used to determine/identify jamming, by monitoring a number of frequency bands which are utilized for the cellular communication (e.g. four frequency bands) and upon detecting high noise levels in all of the frequency bands (e.g. or in most of them) determining that jamming is being applied to the communication system. In this connection it should be understood that the jamming detection module 212 may be partially or entirely included in the cellular modem—for example in the form of software (e.g. firmware) or hardware operable for performing such detection of jamming and issuing a control signal indicative thereof.

Upon detection of failure/jamming of at least one of the positioning and communication modules 230 and 220, the control signal CSig is issued indicating that the normal mode of operation of the tracking system 200A is disrupted. In this case, the control system 210 shifts to operate in the second, disrupted mode of operation.

When in the disrupted mode of operation, the encoder module (responsive to the control signal CSig) generates a distress signal SSig to be broadcasted by the vehicle. Operation 330 is carried out by the controller 210 to obtain data about the vehicle which is to be encoded in the distress signal SSig. Operation 330 may include: 332 obtaining data identifying the vehicle, 334 obtaining data indicative of the vehicle's location, and 336 obtaining data indicative of the vehicle's orientation/direction of driving.

In operation 340 the distress signal is encoded with the vehicle data and broadcasted. The encoder module 214 encodes the distress signal with data identifying the vehicle. The data identifying the vehicle may for example include one or more vehicle identifiers such as the vehicle registration number, and/or the vehicle's network address, and/or the vehicle's subscription number in the tracking system, and/or any other identifier usable for the control center CC for identifying the vehicle. The identifier may be provided from a memory 218 associated with the controller 210. Optionally, the encoder also encodes positioning data in the distress signal SSig to be broadcasted. For example, in cases where the positioning system 230 is properly functioning (e.g. it is not being jammed), positioning data relating to the vehicles location and/or orientation may be retrieved from the positioning system 230 and encoded in the distress signal SSig. In cases where the positioning system is dis-functioning, for example due to jamming thereof, the distress signal may be encoded with one or more of the following positioning data pieces: (i) a last known position of the vehicle that was previously obtained from the positioning system 230 and stored by the controller 210 (e.g. in a memory associated therewith); and/or (ii) positioning data obtained from other utilities in the vehicle, such as from inertial navigation system in the vehicle (in case such a system is installed in the vehicle); and/or (iii) orientation data obtained from a compass module 219 associated with system 200A. It should be noted that alternatively or additionally, in some embodiments the distress signal may not be encoded with positioning data. The estimated location and possibly also the estimated orientation of the vehicle may be obtained by other means, for example as noted above in (i); it may also be estimated based on data obtained from the positioning system(s) and/or signal receivers of other subscriber vehicles which receive the distress signal(s) from the jammed vehicle, and/or it may be estimated from the plurality of notifications on the receipt of the vehicle distress signals from multiple subscriber vehicles.

As indicated above, additional data relating to the operational state of the vehicle such as its ignition status and speed, as well as data indicating the intensity at which the distress signal is to be transmitted, may also be encoded in the distress signal in operation 340 performed by the encoder module 214.

According to some embodiments of the present invention, the vehicle tracking system 200A is adapted for carrying out optional operation 342 for encrypting data encoded in the distress signal such that that data cannot be determined by sniffing receivers intercepting the distress signal SSig, while not having the decryption code needed to decipher the signal. In some embodiments only some portions of the data are encrypted. For example, in some cases an identifier of the broadcasting vehicle is not encrypted to allow the control center and/or the distress signal receiving vehicle to utilize this piece of information for retrieval of a complementary decryption key for decrypting the encrypted parts of the distress signal.

Utilizing the encryption of the data transmitted in the distress signal SSig provides for improving the security and reliability provided by the system 200A, since it generally prevents using transmission of false/misleading distress signals by third party transmitters, which may be used by vehicle thieves to deceive the Control Center by sending wrong data thereto and/or by overloading the control center with large amounts of fake distress signals to disrupt operation of the control. However, this may be prevented when utilizing the transmission/broadcast of encrypted distress signals, because in this manner the entity decrypting the data encoded in the distress signals, be it the distress signal receiving vehicle and/or the control center, may utilize the encryption to distinguish between authentic distress signals (whose data is encrypted utilizing the proper encryption key, typically predetermined in advance) and fake signals which are either not encrypted or encrypted with the wrong encryption scheme or key.

To this end, it should be noted that according to certain embodiments of the present invention the encoder may be configured and operable for encrypting the data encoded in the distress signal by utilizing a predetermined encryption code which may be associated with the particular vehicle and/or with multiple vehicles that are members/subscribers of the vehicle tracking network. The encryption code may be retrieved from the memory 217 and may be stored there in advance, e.g. by wireless communication between the control center and the controller when the system 200A is in its normal mode of operation state. The encryption may be symmetric encryption (e.g. where the same key is used for both encrypting and decrypting the data, or or asymmetric encryption, i.e. utilizing public and private keys as known in the art).

After preparing the distress signal encoded with the desired data, the controller 210 performs an operation to facilitate broadcasting of the distress signal, such that it can be received by one or more subscriber vehicles located in the vicinity of the jammed vehicle. This will cause/initiate automatic notification on the "jammed" vehicle's condition, which will be communicated from the distress signal receiving vehicles to the control center. In this connection it should be noted that the communication module 220 of the vehicle tracking system 200A may include a wireless network module 224 operable for communication with the control center CC via the wireless communication network, and a broadcasting 222 module capable of broadcasting the distress signal. In some embodiments the communication module 220 comprises one or more RF transmitter and receiver modules (e.g. RF transceiver(s); not specifically shown in the figure) that are used by the wireless network module 224 and are operable for exchanging communication signals with the wireless communication network. In this connection the one or more RF transmitter and receiver modules of the communication module 220 may also be used according to some embodiments of the present invention for transmitting/broadcasting and/or receiving/detecting distress signals that are broadcasted according to the invention when a vehicle is being jammed (its communication with the wireless network services and/or positioning services is jammed). Alternatively or additionally, separate/other transmitter modules (not specifically shown in the figure) may be included in the communication module 220 for broadcasting the distress signal from the vehicle and/or separate/other receiver module (not specifically shown in the figure) and may be included in the communication module 220 for detecting distress signals broadcasted by other subscriber vehicles in the vicinity of thereof.

As will be appreciated by those versed in the art, the modules 212 and 214 of the controller 210, can be implemented by analogue means (e.g. utilizing suitable analog circuits for determining the occurrence of jamming and/or for generating, encoding and possibly decrypting data in the distress signal SSig. Alternatively or additionally, these modules may be entirely and/or partially implemented digitally. In the latter case, for example, the system 200A may be a computerized system including processing unit/processor 218 and a memory 217. To this end, as indicated above, the system 200A and the vehicle tracking receiving module 215 may be implemented by analogue and/or by digital means. In case system 200A is implemented as a computerized system, the certain modules of the system may be implemented as a hardware and/or software module, and the processor 218 may be adapted for executing computer readable code (e.g. stored in memory 217) associated with the operations thereof (e.g. the operations described with reference to method 200B above and possibly also 200C below). More specifically, the processor 218 may be adapted for running computer readable code (e.g. stored in the memory 217) associated with the jamming detection module 212 and including suitable instructions for determining the occurrence of jamming/disruption in the wireless network communication module and/or with the positioning system. Additionally the processor 218 may be adapted for running computer readable code for operation of a signal generator (which may be included in system 200A but not specifically shown in the figure) for generating a distress signal carrier, and also running a computer readable code of the encoder module 214 including suitable instructions for encoding data in the distress signal (e.g. by modulating the distress signal carrier) and possibly encrypting such data before it is encoded. In addition, as will be appreciated by those versed in the art, the system 200A may also include various analogue and or digital modules associated with the generation and/or reception of signals and their encoding and/or decoding. For example such elements may include Analogue to Digital converters A/D and/or Digital to Analogue converters D/A, and or signal generators, (e.g. local oscillators and/or signal amplifiers), and signal modulators, and possibly also additional modules which may be used for generation/encoding and/or reception/decoding of distress signals and or other signals to be processed by the systems, such as signals/or data obtained from the positioning system and/or from the communication module.

Thus vehicle tracking system 200A discussed above is adapted for communicating the vehicle data to the control-center CC via the wireless communication network, and in case jamming is detected that prevents such communication of the vehicle data, system 200A is adapted for broadcasting an encoded distress signal such that it can be detected by another vehicle in its vicinity. According to some embodiments of the present invention system 200A is also adapted for receiving and detecting distress signals broadcasted by another subscriber vehicle in the vicinity of the vehicle at which the system 200A is installed. In this connection the vehicle tracking system 200A of the invention may include means for performing either one or both of the following operations: (i) encoding and broadcasting the distress signal in cases where the vehicle is jammed; and/or (ii) detecting distress signals from other subscriber vehicles and communicating indication thereof to the control center.

In the latter case system 200A includes a vehicle tracking receiving module 215 including a decoder module 216 that is connectable to a receiver (being at least one of the receivers and/or transceivers of the communication module 220) capable of receiving/detecting received distress signals RSSig broadcasted by another subscriber vehicle. The decoder module 216 is responsive to the received distress signal RSSig for decoding it and generating a corresponding notification signal NSig; the vehicle tracking receiving module (e.g. being part of the controller 210) is adapted for communicating the notification signal NSig to the control center CC via the wireless communication network together with position data about the another subscriber vehicle.

As noted above, distress signals that are broadcasted by the jammed subscriber vehicles may encode/include encrypted data indicative of the jammed subscriber vehicle and possibly of its position. In some embodiments of the present invention the decoder 216 is adapted to include the encrypted data in the notification signal that is to be communicated to the control center CC. The control center CC, receiving such encrypted data, operates to decrypt the data utilizing a predetermined decryption key. Alternatively or additionally, the decoder may be adapted for decrypting the data encoded in the received distress signal and include the decrypted data in the notification signal sent to the control center CC.

As indicated above, the system 200A and the vehicle tracking receiving module 215 may be implemented by analogue and/or by digital means. In the latter case the vehicle tracking receiving module 215 may be implemented as a hardware and or software module and the processor 218 may be adapted for executing computer readable code (e.g. stored in memory 217) implementing the operations of module 215 (e.g. operations described with reference to method 200C in the following).

FIG. 3C is a flow chart illustrating a method 200C which may be performed by the system 200A of the invention for tracking subscriber vehicles being subscriber to the vehicle tracking network of the invention. The method includes operation 350 operating at a member of the vehicle tracking network for detecting distress signals broadcasted by subscriber vehicle(s) of the network. Operation 350 includes operating a receiver/transceiver at the subscriber vehicle to monitor a signal band associated with the broadcasting of the distress signals in the vehicle tracking network, and to thereby enable detection of a distress signal broadcasted by a subscriber vehicle located in the vicinity of the member vehicle at which method 200C is performed. To this end, with reference to system 200A, the controller 210 may operate one or more of the receivers of the communication module 220 for monitoring the desired frequency band (e.g. RF frequency band) of the distress signals.

Upon determining, in operation 360, that a distress signal has been detected/received, the decoder module 216 will carry out operation 370 for decoding the distress signal and determining the data encoded therein. Operation 370 may optionally include sub operation 372 in which decryption of encrypted data encoded in the distress signal is performed. In sub-operation 374 data identifying the vehicle broadcasting the distress signal is decoded from the distress signal. This data, after decoding, may or may not be in encrypted form, depending on the configuration and operation of the specific embodiment of the system. In optional sub-operation 376 and 378 data indicative of the orientation/heading and/or location of the vehicle broadcasting the distress signal may be decoded from the distress signal. In this connection it should be understood that such data may be in the first place encoded in the distress signal, only in cases where the broadcasting vehicle had access to such information, namely in cases where its positioning system is not jammed and/or it has an internal (inertial) positioning system and/or compass module (magnetic or gyroscopic compass) operable for providing orientation and/or location data.

Optionally, the method 200C also includes operation 380 in which the position of the distress signal receiving vehicle is determined and provided as an estimate to the location of the vehicle broadcasting the distress signal (the distressed vehicle). In this operation the vehicle tracking receiver module 215 may utilize the positioning system/module 230 to assess location of the vehicle. Since the distress signal is detectable over a limited range of distances (e.g. up to a few hundred meters), the location from the positioning system of the distress signal received provides a good estimate of the location of the distress signal broadcasting vehicle. Alternatively or additionally, the relative distance and speed between the distress signal transmitting vehicle and the distress signal receiving vehicle may be estimated based on the strengths of the received distress signal, its duration, and the speed and/or location of the stress signal receiving vehicle. This may be used for improving the estimated accuracy of the distressed vehicle's position. Additionally, in cases where two or more receivers/antennas are used to receive the stress signal, the relative direction between the stress signal transmitting and receiving vehicles may also be estimated enabling further improvement in the estimation of the position of the stress signal transmitting vehicle.

In operation 390 the controller 210 operates the communication module 220 to communicate the notification on the detected distress signal to the control center CC via the wireless network (e.g. by utilizing the wireless network module in operation 392). To this end, the notification may include encrypted and/or un-encrypted data indicating the identity of the distress signal broadcasting vehicle (i.e. vehicle identifier), and data indicative of the location and possibly also of the orientation of the distress signal broadcasting vehicle. In this connection, as noted above, the orientation and/or driving direction of the distress signal broadcasting vehicle may be obtained at the control center CC in any number of ways. It may be encoded in the broadcasted distress signal (e.g. based on information from a compass module in the distress signal broadcasting vehicle and then communicated to the control center in the notification from the distress signal receiving vehicle), and/or it may be estimated by the control center by processing notifications received with regard to the distress signal from one or more subscriber vehicles detecting the distress signal at different times and at different locations (from those times and respective locations, the direction of driving of the distressed vehicle (e.g. and the route/road on which it being driven) may be determined/estimated). Typically, the notification communicated to the control center may also include data indicative of the notifying member vehicle and possibly also its speed, heading and location, thus further improving the ability of the control center to estimate the location and heading of the subscriber vehicle that is being tracked.

As indicated above, according to some embodiments of the present invention, vehicles of the vehicle tracking network may be associated with various types of licensing agreements according to which they may be entitled to receiving different services from the vehicle tracking network. For example in some embodiments, the member vehicles of the vehicle tracking network may be associated with the following categories:

General member vehicles: members of the vehicle tracking network that are capable of detecting distress signals transmitted by subscriber vehicles of the network but are incapable of broadcasting such distress signals themselves in case they are jammed. These vehicles may be furnished with a vehicle tracking receiver module for detection stress signals broadcasted by other vehicles.

Regular subscriber vehicles: subscribers to the vehicle tracking network that are capable of both broadcasting distress signals in case they are being jammed, and detecting distress signals broadcasted by other subscriber vehicles of the vehicle network.

Premium subscriber vehicles: subscribers to the vehicle tracking network that are capable of broadcasting distress signals in case they are being jammed, but are not configured for detecting distress signals broadcasted by other subscriber vehicles of the vehicle network.

It should be noted that the system 200A described above with reference to FIG. 3A is generally suited for installation in the regular subscriber vehicles subscriber vehicles as it provides for both broadcasting of distress signals and detection of distress signals from other subscriber vehicles. Also, with proper modification of the operation of the system 200A it may also be installed at the regular member vehicles and/or at the premium subscribers.

Figure 4A:
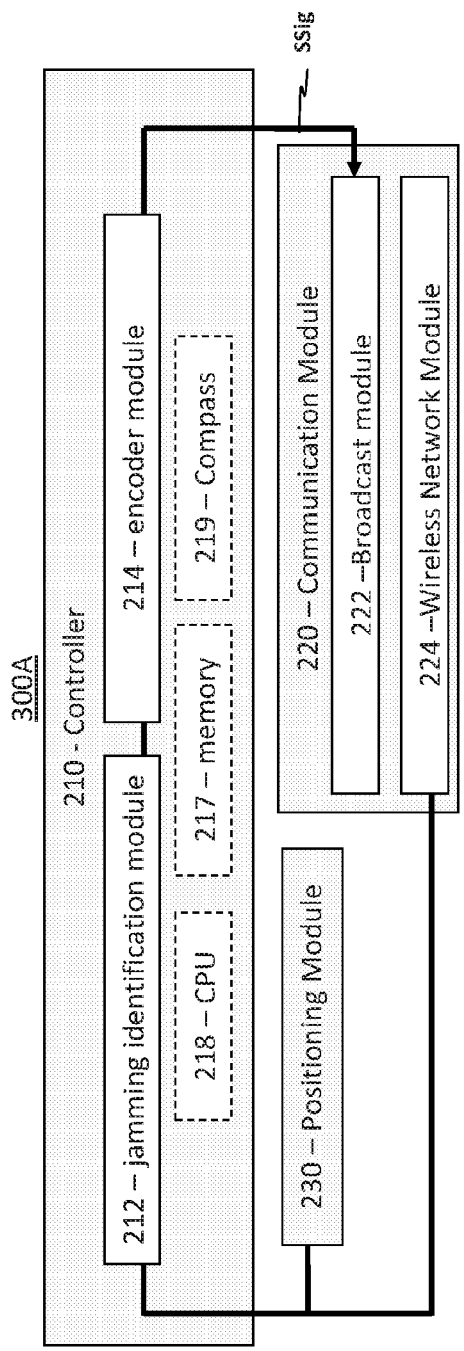
FIGS. 4A and 4B are block diagrams 300A and 300B respectively illustrating two vehicle tracking systems, which are configured according to two embodiments of the invention for installation in different types of subscriber vehicles of the vehicle tracking network of the invention.
Figure 4B:
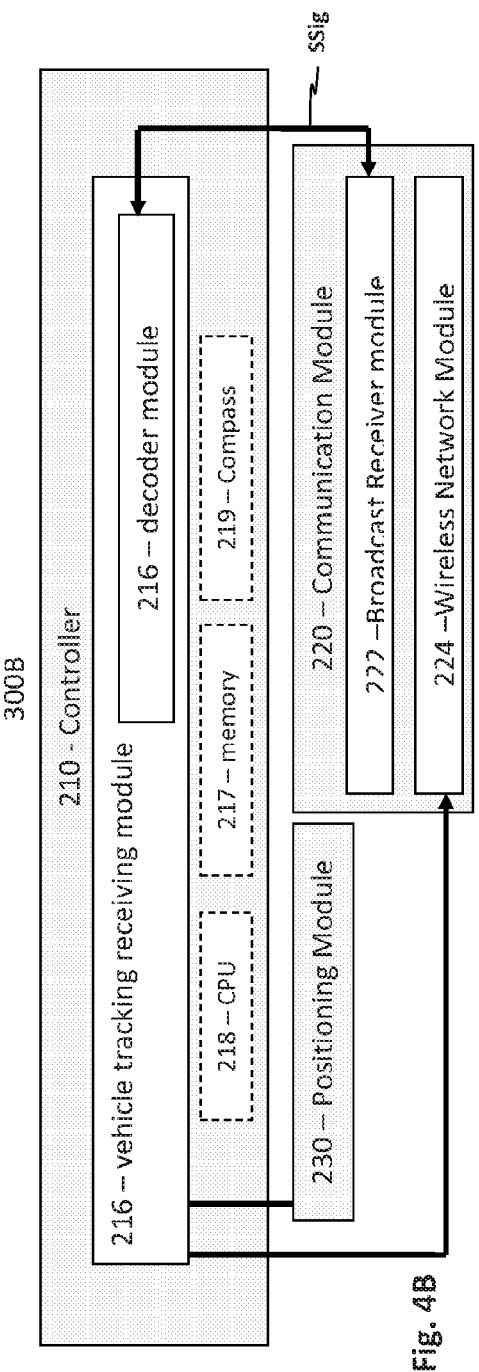

In this connection reference is made together to FIGS. 4A and 4B which are block diagrams respectively illustrating vehicle tracking systems 300A and 300B according to two embodiments of the invention, which are respectively configured and operable for specific installation in premium subscriber vehicles, and in regular member vehicles. Each of these systems includes some of the modules of system 200A, which were described above. Accordingly the operation of the modules and the integration between them need not be described in detail with references to these figures, except for the following:

System 300A is directed for installation in vehicles that are premium subscribers to the vehicle tracking network of the present invention. Accordingly, this system includes modules required for determining whether jamming is applied to the tracking system at the vehicle (e.g. to the positioning system and/or to the wireless communication module thereof), and for broadcasting a distress signal in response. In this connection, the system 300A is configured and operable for carrying out the operations of method 200B above.

System 300B is directed for installation in vehicles that are regular members of the vehicle tracking network of the present invention. Accordingly, this system includes modules required for detecting distress signals broadcasted by vehicles in their vicinity and communicating notification to the control center upon detection of such distress signals. In this connection, system 300B is configured and operable for carrying out the operations of method 200B above.

The embodiments described above exemplify the technique of the present invention as well as systems and method according to the present invention, for tracking vehicles even in cases where they are jammed. It should be understood that a person of ordinary skill in the art will readily appreciate that various modifications may be applied to the systems and method exemplified above without departing from the present invention as defined in the appended claims.

The invention claimed is:

1. A vehicle tracking system configured for installation in a subscriber vehicle being a subscriber to a vehicle tracking network, the vehicle tracking system comprising a controller connectable to a wireless communication module and adapted for operating said wireless communication module for communicating vehicle data associated with said vehicle to a control center of the vehicle tracking network via a wireless communication network, wherein the controller is associated with a jamming identification module adapted to monitor operation of the wireless communication module and a positioning systems to identify failure in communicating position data to the control center via said wireless communication network and upon identifying said failure, generating a control signal indicative of a vehicle condition; and wherein the controller is configured and operable to generate a corresponding distress signal in response to said control signal, and broadcast the distress signal such that said distress signal is detectable by one or more of the subscriber vehicles that are located in the vicinity of said vehicle, to thereby initiate automatic communication of a notification indicative of said vehicle condition and including position data indicative of at least an approximated location of said vehicle and heading direction of said vehicle, from said one or more subscriber vehicles to the control center;

wherein the controller is connectable to a compass module and is configured to utilize said compass module to obtain orientation data indicative of said heading direction of said vehicle from the compass module at least in case said positioning system is being jammed, and wherein the controller is configured to encode said orientation data in the distress signal, to thereby enable said one or more subscriber vehicles to extract the orientation data indicative of the heading direction from said distress signal and encode said orientation data in the notification communicated to the control center.

2. The vehicle tracking system of claim 1, wherein the controller further comprises:
a vehicle tracking receiver module adapted for receiving distress signals broadcasted by another subscriber vehicle; thereby causing the controller to be responsive to a received distress signal for generating a corresponding notification signal comprising position data indicative of location of said another subscriber vehicle, and communicating the notification signal to the control center via said wireless communication network;
wherein the controller of the subscriber vehicle is capable to be responsive to the received distress signal for estimating an approximated location of said another subscriber vehicle by operating the positioning system of the subscriber vehicle to determine a location of said subscriber vehicle, and utilizing said location of the subscriber vehicle as the approximated location of said another subscriber vehicle, and encoding said location of the subscriber vehicle in said notification signal.

3. The vehicle tracking system of claim 2, wherein said wireless communication module is adapted for: (i) communicating said vehicle data to said control-center via said wireless communication network; (ii) broadcasting said encoded distress signal; and (iii) receiving distress signals broadcasted by another subscriber vehicle.

4. The vehicle tracking system of claim 2, wherein said wireless communication module comprises: a wireless network module operable for communication via said wireless communication network; a broadcasting module capable of broadcasting said distress signal; and a receiver capable of receiving the distress signals broadcasted by another subscriber vehicle.

5. The vehicle tracking system of claim 2, wherein said vehicle tracking receiver is adapted for detecting distress signals transmitted by other vehicles located within a distance not exceeding a few hundred meters from said vehicle, thereby enabling utilizing the location of said vehicle tracking receiver as an estimate of the location of said vehicle.

6. The vehicle tracking system of claim 2, wherein said encoder is adapted for utilizing a predetermined encryption code for encrypting the data to be encoded in the distress signal; and wherein the received distress signal from said another subscriber vehicle, includes encrypted data indicative of said another subscriber vehicle, and said decoder is adapted for decrypting the received distress signal by utilizing a predetermined decryption code and generating said notification signal based on the decrypted data.

7. The system of claim 2, configured and operable to encode in the notification signal, data indicative of an estimated relative distance between the subscriber vehicle and the another subscriber vehicle; and wherein said data indicative of said estimated relative distance is determined based on a strength of the received distress signal by the subscriber vehicle, and intensity data, which is encoded in the distress signal, and indicative of an intensity at which the distress signal was transmitted by the another subscriber vehicle.

8. The vehicle tracking system of claim 1, wherein said failure in the communication with the control center includes one or more failures associated with disconnection or jamming of the communication with said wireless communication network.

9. The vehicle tracking system of claim 1, comprising a positioning system; said controller is connectable to said positioning system for receiving therefrom positioning data indicative of at least one of a location and heading of said vehicle and wherein the vehicle data communicated to said control center via the wireless communication network includes data identifying said vehicle and said positioning data.

10. The vehicle tracking system of claim 9, wherein said failure includes one or more failures in determining at least one of a location and an orientation of the vehicle by said positioning system.

11. The vehicle tracking system of claim 1, wherein said encoded distress signal encodes at least one of the following: data identifying said vehicle and positioning data associated with said vehicle.

12. The vehicle tracking system of claim 1, wherein said positioning data includes data indicative of the heading direction of said vehicle obtained from at least one of a compass module connectable to said controller, and a positioning system associated with said vehicle being at least one of a satellite based global positioning system (GPS), and a network based positioning system; and wherein in case said positioning system is being jammed, the controller is adapted to utilize said compass module to obtain data indicative of the heading direction of said vehicle.

13. The system of claim 1, wherein the controller is further configured to encode in the distress signal data indicative of one or more of the following: ignition status of the subscriber vehicle; speed of the subscriber vehicle, and an intensity at which the distress signal is to be transmitted.

14. A method for tracking vehicles being subscriber vehicles to a vehicle tracking network, the method comprising:
monitoring operation of one or more services related to at least one of a wireless network communication service and positioning service associated with the subscriber vehicle; and upon detecting a failure in at least one of said services, generating a control signal indicative of a vehicle condition; in response to said control signal, generating a corresponding distress signal encoded to be identifiable by subscriber vehicles of the vehicle tracking network; and broadcasting the encoded distress signal such that said encoded distress signal is detectable by said one or more subscriber vehicles of the vehicle tracking network which are located in the vicinity of said vehicle, thereby initiating automatic notification of said vehicle condition from said one or more subscriber vehicles to the control center; wherein said encoded distress signal encodes data associated with said subscriber vehicle and includes orientation data indicative of a heading direction of said subscriber vehicle whereby at least in case a positioning system associated with the subscriber vehicle is being jammed, said orientation data is obtained from a compass module at the subscriber vehicle.

15. The method of claim 14, further comprising:
receiving a distress signal broadcasted by another subscriber vehicle of said vehicle tracking network located in the vicinity of said vehicle; in response to the received distress signal, generating a corresponding notification signal including position data indicative of approximated location of said another vehicle;
wherein said generating of said notification signal includes determining an estimated location of said another subscriber vehicle by carrying out at least one of the following: decoding the location of said another vehicle, encoded in said another vehicle's distress signal; operating a positioning system of the subscriber vehicle to determine a location of the subscriber vehicle and using said location of the subscriber vehicle as an estimate of the approximated location of said another vehicle; and communicating the notification signal to the control center via a wireless communication network together with position data about said another subscriber vehicle.

16. The method of claim 15, wherein said another vehicle's distress signal encodes encrypted data and wherein at least one of the following:

said decoding of the distress signal comprises decrypting said encrypted data utilizing a predetermined decryption code the method comprises communicating the encrypted data to the control center.

17. The method of claim 15, wherein said generating of said notification signal comprises encoding data indicative of an estimated relative distance between the subscriber vehicle and the another subscriber vehicle, in the notification signal; whereby said data indicative of the estimated relative distance is based on a strength of the received distress signal by the subscriber vehicle, and an intensity at which the distress signal was transmitted by the another subscriber vehicle, as encoded in the distress signal.

18. The method of claim 14, wherein detecting said failure comprises identifying mis-operation of said one or more services and assessing whether said mis-operation is associated with jamming of said one or more services for the vehicle.

19. The method of claim 14, comprising obtaining position data indicative of at least an orientation of said subscriber vehicle and encoding said position data in the distress signal.

20. The method of claim 19, wherein obtaining said position data comprises at least one of the following:

in case said positioning service is operable, the method includes utilizing said positioning service for obtaining said position data including at least one of a location and an orientation of said subscriber vehicle; and receiving data indicative of the heading direction of said vehicle from a compass module installed in the subscriber vehicle.

21. The method of claim 14, wherein said broadcasting of the distress signal comprises operating an RF transmitter to transmit said distress signal, such that said signal is detectable by vehicles located up to a few hundred meters from said vehicle; and said receiving the another vehicle's distress signal includes operating an RF receiver for receiving RF distress signals transmitted by one or more subscriber vehicles located a distance not exceeding a few hundred meters from said subscriber vehicle.

22. The method of claim 14, further comprising encoding in the distress signal data indicative of one or more of the following: ignition status of the subscriber vehicle; speed of the subscriber vehicle; and an intensity at which the distress signal is to be transmitted.

* * * * *